US008874502B2

(12) United States Patent
Williamson (10) Patent No.: US 8,874,502 B2
(45) Date of Patent: Oct. 28, 2014

(54) REAL TIME DATAMINING

(75) Inventor: Eric J. Williamson, Fuquay Varina, NC (US)

(73) Assignee: Red Hat, Inc., Raleigh, NC (US)

( * ) Notice: Subject to any disclaimer, the term of this patent is extended or adjusted under 35 U.S.C. 154(b) by 728 days.

(21) Appl. No.: 12/202,085

(22) Filed: Aug. 29, 2008

(65) Prior Publication Data

US 2010/0057684 A1 Mar. 4, 2010

(51) Int. Cl.
*G06F 17/30* (2006.01)

(52) U.S. Cl.
CPC .... *G06F 17/30572* (2013.01); *G06F 17/30554* (2013.01); *Y10S 707/956* (2013.01)
USPC ............................ 707/603; 707/776; 707/956

(58) Field of Classification Search
USPC .................................. 707/999.102, 603, 776
See application file for complete search history.

(56) References Cited

U.S. PATENT DOCUMENTS

| | | | |
|---|---|---|---|
| 5,278,951 A | | 1/1994 | Camacho et al. |
| 5,657,437 A * | | 8/1997 | Bishop et al. ................. 715/203 |
| 5,819,273 A * | | 10/1998 | Vora et al. .............................. 1/1 |
| 5,850,388 A * | | 12/1998 | Anderson et al. ............. 370/252 |
| 5,918,232 A * | | 6/1999 | Pouschine et al. .................... 1/1 |
| 6,092,050 A | | 7/2000 | Lungren et al. |
| 6,377,287 B1 | | 4/2002 | Hao et al. |
| 6,581,068 B1 * | | 6/2003 | Bensoussan et al. ................. 1/1 |
| 6,611,846 B1 * | | 8/2003 | Stoodley ....................... 707/740 |
| 6,671,680 B1 * | | 12/2003 | Iwamoto et al. ............. 707/737 |
| 6,704,721 B1 * | | 3/2004 | Hellerstein ........................... 1/1 |
| 6,775,675 B1 * | | 8/2004 | Nwabueze et al. ........... 707/600 |
| 6,885,734 B1 * | | 4/2005 | Eberle et al. ................ 379/88.01 |
| 6,985,872 B2 * | | 1/2006 | Benbassat et al. ........... 705/7.14 |
| 6,993,533 B1 * | | 1/2006 | Barnes .................................... 1/1 |
| 6,996,568 B1 * | | 2/2006 | Bedell et al. .................. 715/200 |
| 7,069,263 B1 * | | 6/2006 | Yee et al. ....................... 707/602 |
| 7,181,422 B1 * | | 2/2007 | Philip et al. ................. 705/36 R |
| 7,181,438 B1 | | 2/2007 | Szabo |
| 7,185,279 B2 * | | 2/2007 | Machalek ...................... 715/209 |
| 7,197,508 B1 * | | 3/2007 | Brown, III .................... 707/721 |
| 7,216,086 B1 * | | 5/2007 | Grosvenor et al. .......... 705/7.11 |
| 7,225,113 B2 * | | 5/2007 | Rothschild ........................ 703/2 |

(Continued)

OTHER PUBLICATIONS

Microsoft SQL Server 2005, "Microsoft SQL Server 2005 Data Mining Add-Ins for Office 2007", 2007, 11 pages, accessed online at <http://www.sqlserverdatamining.com/ssdm/Home/DataMiningAddinsLaunch/tabid/69/Default.aspx> on Sep. 22, 2011.*

(Continued)

*Primary Examiner* — Phuong Thao Cao
(74) *Attorney, Agent, or Firm* — Lowenstein Sandler LLP (57) ABSTRACT

A method and apparatus for real time datamining. In one embodiment, the method includes receiving a user request for datamining with respect to a value from a report associated with a specific pyramid level, identifying a datamining function to be performed for statistical analysis of lower level data pertaining to the value from the report, identifying dimensions to be used as variables for the statistical analysis, and determining criteria for selecting the lower level data associated with the value from the report. The method may further include submitting a request to one or more source databases, the request reflecting the identified dimensions and the determined criteria, performing the datamining function on a data set received from the source databases, and creating a datamining report based on a result of the performed datamining function.

20 Claims, 9 Drawing Sheets

(56) References Cited

U.S. PATENT DOCUMENTS

| | | | |
|---|---|---|---|
| 7,304,662 B1* | 12/2007 | Sullivan et al. | 348/150 |
| 7,318,006 B2* | 1/2008 | You et al. | 702/183 |
| 7,356,779 B2* | 4/2008 | Cras et al. | 715/853 |
| 7,433,885 B2* | 10/2008 | Jones | 1/1 |
| 7,441,197 B2* | 10/2008 | Tschiegg et al. | 715/741 |
| 7,505,888 B2* | 3/2009 | Legault et al. | 703/22 |
| 7,529,727 B2* | 5/2009 | Arning et al. | 1/1 |
| 7,571,182 B1 | 8/2009 | Eddy | |
| 7,631,020 B1* | 12/2009 | Wei et al. | 1/1 |
| 7,639,609 B2* | 12/2009 | Bolt et al. | 370/229 |
| 7,698,349 B2* | 4/2010 | Hulen et al. | 707/805 |
| 7,716,257 B2* | 5/2010 | Thomson et al. | 707/809 |
| 7,800,613 B2* | 9/2010 | Hanrahan et al. | 345/440 |
| 7,801,929 B2 | 9/2010 | Williamson | |
| 7,945,850 B2* | 5/2011 | Machalek | 715/212 |
| 7,966,322 B2* | 6/2011 | Clover | 707/728 |
| 8,019,679 B2* | 9/2011 | Bennett et al. | 705/39 |
| 8,099,383 B2* | 1/2012 | Naibo et al. | 707/603 |
| 8,150,879 B2 | 4/2012 | Williamson et al. | |
| 8,204,809 B1* | 6/2012 | Wise | 705/35 |
| 8,468,085 B1* | 6/2013 | Cao et al. | 705/38 |
| 2001/0018694 A1* | 8/2001 | Iwamoto et al. | 707/509 |
| 2001/0054034 A1* | 12/2001 | Arning et al. | 707/1 |
| 2002/0013786 A1* | 1/2002 | Machalek | 707/503 |
| 2002/0016771 A1* | 2/2002 | Carothers et al. | 705/43 |
| 2002/0183965 A1* | 12/2002 | Gogolak | 702/179 |
| 2003/0101067 A1* | 5/2003 | Duran et al. | 705/1 |
| 2003/0139827 A1* | 7/2003 | Phelps | 700/36 |
| 2003/0187716 A1* | 10/2003 | Lee | 705/10 |
| 2003/0217074 A1* | 11/2003 | Wallace | 707/104.1 |
| 2004/0122844 A1* | 6/2004 | Malloy et al. | 707/102 |
| 2004/0153435 A1 | 8/2004 | Gudbjartsson et al. | |
| 2005/0010565 A1* | 1/2005 | Cushing et al. | 707/3 |
| 2005/0044079 A1 | 2/2005 | Abineri et al. | |
| 2005/0080802 A1* | 4/2005 | Cras et al. | 707/100 |
| 2005/0091206 A1* | 4/2005 | Koukerdjinian et al. | 707/3 |
| 2005/0171833 A1* | 8/2005 | Jost et al. | 705/10 |
| 2005/0192963 A1* | 9/2005 | Tschiegg et al. | 707/9 |
| 2005/0262047 A1* | 11/2005 | Wu et al. | 707/2 |
| 2006/0004830 A1* | 1/2006 | Lora et al. | 707/102 |
| 2006/0031110 A1* | 2/2006 | Benbassat et al. | 705/9 |
| 2006/0031209 A1* | 2/2006 | Ahlberg et al. | 707/3 |
| 2006/0111874 A1* | 5/2006 | Curtis et al. | 702/186 |
| 2006/0112070 A1* | 5/2006 | Ramos | 707/1 |
| 2006/0117057 A1* | 6/2006 | Legault et al. | 707/102 |
| 2006/0149778 A1* | 7/2006 | Clover | 707/102 |
| 2006/0156967 A1* | 7/2006 | You et al. | 116/4 |
| 2006/0245470 A1* | 11/2006 | Balachandran et al. | 375/133 |
| 2006/0271884 A1 | 11/2006 | Hurst | |
| 2006/0282474 A1* | 12/2006 | MacKinnon, Jr. | 707/200 |
| 2007/0055596 A1* | 3/2007 | Yankovich et al. | 705/35 |
| 2007/0129997 A1* | 6/2007 | Davies | 705/14 |
| 2007/0130517 A1* | 6/2007 | Wu | 715/530 |
| 2007/0143661 A1* | 6/2007 | Machalek | 715/503 |
| 2007/0150862 A1* | 6/2007 | Naibo et al. | 717/110 |
| 2007/0156677 A1 | 7/2007 | Szabo | |
| 2007/0156718 A1* | 7/2007 | Hossfeld et al. | 707/100 |
| 2007/0192143 A1* | 8/2007 | Krishnan et al. | 705/3 |
| 2007/0192724 A1* | 8/2007 | Devore et al. | 715/772 |
| 2007/0203770 A1* | 8/2007 | Grosvenor et al. | 705/7 |
| 2007/0219972 A1* | 9/2007 | Cragun et al. | 707/3 |
| 2007/0250466 A1* | 10/2007 | Imrapur et al. | 707/1 |
| 2007/0255574 A1* | 11/2007 | Polo-Malouvier et al. | 705/1 |
| 2007/0255681 A1* | 11/2007 | Tien et al. | 707/2 |
| 2007/0282673 A1* | 12/2007 | Nagpal et al. | 705/11 |
| 2007/0291757 A1* | 12/2007 | Dobson et al. | 370/392 |
| 2008/0005674 A1* | 1/2008 | Wattenberg et al. | 715/730 |
| 2008/0033587 A1* | 2/2008 | Kurita et al. | 700/100 |
| 2008/0040309 A1 | 2/2008 | Aldridge | |
| 2008/0086716 A1* | 4/2008 | Devore et al. | 717/102 |
| 2008/0133568 A1 | 6/2008 | Grosset et al. | |
| 2008/0133582 A1* | 6/2008 | Andersch et al. | 707/102 |
| 2008/0175150 A1* | 7/2008 | Bolt et al. | 370/235 |
| 2008/0175478 A1* | 7/2008 | Wentland et al. | 382/181 |
| 2008/0248875 A1* | 10/2008 | Beatty | 463/42 |
| 2008/0294996 A1* | 11/2008 | Hunt et al. | 715/739 |
| 2008/0306784 A1* | 12/2008 | Rajkumar et al. | 705/7 |
| 2008/0307430 A1 | 12/2008 | Friedlander et al. | |
| 2009/0006455 A1* | 1/2009 | Carroll | 707/102 |
| 2009/0012983 A1 | 1/2009 | Senneville et al. | |
| 2009/0018996 A1* | 1/2009 | Hunt et al. | 707/2 |
| 2009/0055467 A1* | 2/2009 | Petersen | 709/203 |
| 2009/0106290 A1* | 4/2009 | Rivard | 707/102 |
| 2009/0164508 A1* | 6/2009 | Legault et al. | 707/102 |
| 2009/0171606 A1* | 7/2009 | Murata et al. | 702/82 |
| 2009/0193050 A1* | 7/2009 | Olson | 707/102 |
| 2009/0222470 A1* | 9/2009 | Kemp et al. | 707/102 |
| 2009/0234710 A1* | 9/2009 | Belgaied Hassine et al. | 705/10 |
| 2009/0259501 A1* | 10/2009 | Poissant | 705/7 |
| 2009/0300533 A1 | 12/2009 | Williamson | |
| 2009/0313268 A1* | 12/2009 | Folting et al. | 707/100 |
| 2010/0057756 A1 | 3/2010 | Williamson | |
| 2010/0057764 A1 | 3/2010 | Williamson | |
| 2010/0125813 A1 | 5/2010 | Choudhury | |
| 2010/0138449 A1 | 6/2010 | Williamson | |
| 2010/0332583 A1 | 12/2010 | Szabo | |

OTHER PUBLICATIONS

IBM, Statistical Functions, 2 pages, copyright 1989-2011, accessed online at <http://publib.boulder.ibm.com/infocenter/spssstat/v20r0m0/index.jsp?topic=%2Fcom.ibm.spss.statistics.help%2Fsyn_transformation_expressions_statistical_Junctions.htm> on Jul. 10, 2013.*
Robinson, M., "Developing Report Navigation and Drilldown", SQL Server 2005, Aug. 2006, 13 pages, accessed online at <http://msdn.microsoft.com/en-us/library/aa964132(d=printer,v=sql.90).aspx> on Jul. 10, 2013.*
Report Studio User Guide 10.1.0, "Using Drill-Through Access", IBM, last updated Oct. 20, 2010, 3 pages, accessed online at <http://pic.dhe.ibm.com/infocenter/cbi/v10r1m0/index.jsp?topic=%2Fcom.ibm.swg.im.cognos.ug_cr_rptstd.10.1.0.doc%2Fug_cr_rptstd_id28247cr_rptstd_modrep_drill_through_acce.html> on Jul. 10, 2013.*
Shapiro, A., "Analysis Services: Choosing Dimension Types in SQL Server 2000 Analysis Services", SQL Server 2000, Jul. 2000, 23 pages, accessed online at <http://msdn.microsoft.com/en-us/library/aa902636(d=printer,v=sql.80).aspx> on Jul. 10, 2013.*
Notice of Allowance for U.S. Appl. No. 12/074,035, mailed on May 24, 2010.
Office Action for U.S. Appl. No. 12/156,309, mailed on Jun. 23, 2011.
Office Action for U.S. Appl. No. 12/156,309, mailed on Nov. 30, 2011.
Office Action for U.S. Appl. No. 12/202,087, mailed on Mar. 15, 2011.
Office Action for U.S. Appl. No. 12/202,087, mailed on Aug. 31, 2011.
Office Action for U.S. Appl. No. 12/325,235, mailed on Sep. 22, 2011.
Office Action for U.S. Appl. No. 12/202,077, mailed on Feb. 17, 2011.
Office Action for U.S. Appl. No. 12/202,077, mailed on Aug. 3, 2011.
Notice of Allowance for U.S. Appl. No. 12/202,077, mailed on Nov. 25, 2011.
Shapiro, Adam, Analysis Services: Choosing Dimension Types in SQL Server 2000 Analysis Services, Jul. 19, 2001, Microsoft, 1-15.
Red Hat Office Action for U.S. Appl. No. 12/325,235, mailed on Nov. 6, 2012.
Red Hat Office Action for U.S. Appl. No. 12/325,235, mailed on Jun. 28, 2012.
Red Hat Office Action for U.S. Appl. No. 12/325,235, mailed on Sep. 22, 2011

* cited by examiner

| MULTIPLE REGRESSION ANOVA (ANALYSIS OF VARIANCE) 530 | | | | | |
|---|---|---|---|---|---|
| | REGRESSION 532 | RELIEF 534 | AREA 536 | SHAPE 538 | RESIDUAL 540 |
| SUM OF SQUARES 542 | 2700.25 | 195.42 | 45.3 | 80.3 | 980.72 |
| DEGREES OF FREEDOM (DF) 544 | 5 | 1 | 1 | 1 | 1 |
| F STATISTIC 546 | 12.3 | 6.5 | 2 | 2.32 | - |
| P > F 548 | <0.003 | .007 | 0.185 | 0.112 | - |
| MEAN SQUARES 550 | 250.15 | 200.98 | 45.17 | 65.79 | 25.4 |

PYRAMID REPORTING

600

YEAR 2007  ACCOUNT SALES
COUNTRY USA  AMOUNT $1,000
DRIVE TYPE 2WD
STYLE ALL Σ

604

DRILL TO PYRAMID LEVEL  3  606

REPORT FORMAT: SPREADSHEET ▶ 608

PLEASE INDICATE DELIVERY METHOD: ▶ 610

EMAIL

EMAIL ADDRESS: ____________

TIME  NONE  ▶

[ OK ]   [ CANCEL ]

| DEALERSHIP: ALL Σ | MONTH | JAN | FEB | MAR | APR | MA | TOTAL |
|---|---|---|---|---|---|---|---|
| JACK'S AUTO SALES | | 500 | 750 | 13 | 650 | 75 | |
| JIM'S CARS AND MORE | | 50 | 20 | 45 | 75 | 12 | |
| HONEST JONES AUTOS | | 0 | 0 | 0 | 0 | 15 | |
| SLEAZY SAMS SALES | | 75 | 0 | 0 | 0 | 0 | |
| JEFFREY'S JALLOPIES | | | | | | | |

STATE  RHODE ISLAND  ILLINOIS  ALL Σ

1
2
3
4

620

| DEALERSHIP | DEALER NUMBER | DEALER CITY | STATE CODE | SELL DATE | VEHICLE | DRIVE TYPE | PRICE |
|---|---|---|---|---|---|---|---|
| JACKS AUTO | 4325 | PROVIDENCE | RI | FEB. 13, 2007 11:59:00 AM | FERRARI 2/05 | 2WD | 175,135 |
| JACKS AUTO | 4325 | PROVIDENCE | RI | FEB. 23, 2007 1:13:05 PM | LAMBORGHINI HS | 2WD | 223,145 |
| JACKS AUTO | 4325 | PROVIDENCE | RI | FEB. 6, 2007 11:25:04 AM | FERRARI 2/05 | 2WD | 175,135 |
| JACKS AUTO | 4325 | PROVIDENCE | RI | FEB. 2, 2007 6:41:55 PM | FERRARI 2/05 | 2WD | 175,585 |

TOTAL 750,000

REAL TIME DATAMINING

RELATED APPLICATIONS

This application is related to U.S. patent application Ser. No. 12/074,035, entitled "Pyramid Reporting Tool," filed on Feb. 29, 2008 (which issued as U.S. Pat. No. 7,801,929 on Sep. 21, 2010), U.S. patent application Ser. No. 12/156,309, entitled "ETL Tool Utilizing Dimension Trees," filed on May 31, 2008, U.S. patent application Ser. No. 12/202,077, entitled "Building Custom Dimension Trees," filed on Aug. 29, 2008, and U.S. patent application Ser. No. 12/202,087, entitled "Creating Reports Using Dimension Trees," filed on Aug. 29, 2008, and assigned to the assignee of the present application and hereby by reference in their entireties.

TECHNICAL FIELD

Embodiments of the present invention relate to data reporting, and more specifically, to real time datamining.

BACKGROUND

Data stored in a database is usually transactional in nature. A database may be a transactional database or a relational database. Transactional databases simply are a collection of transaction tables. Relational databases add the capacity to match tables together and perform other functions. Since relational databases provide ways to match and organize data, more insight can be achieved through them. Hence, most databases systems by default are relational (encompassing the transactional as well as relational capacity). These databases are intended to contain data in a format that will allow it to be completely matchable with other data in the database or other outside databases. However, this data is not organized in a manner where the natural relationships become apparent or easily utilized. Rather, the relationships in the data are defined and maintained by the application running on top of the database. An individual can only see the relationships in the data if he or she already has an understanding of the database structure and the application functionality.

Database administrators (DBAs) utilizing data for reporting and analysis have attempted to overcome this limitation of data storage using a technique known as On-Line Analytical Processing (OLAP). OLAP provides a capability for copying data from a production (application driven) database into separate OLAP tables. While a production database tends to store the data in many small tables with few columns, OLAP tends to shift the production data into fewer, larger tables with many columns.

OLAP uses dimensions that represent relationship descriptors, categories or drivers. Examples of dimensions may include Time, Location, Product, Industry, Account, etc. Dimensions can be organized into "cubes". A cube contains dimensions and a snippet of data (typically a number) which are reflected by the intersection of dimension selections. There are currently three main OLAP cube systems: ROLAP, in which the cube is virtual, calculated on the fly from the OLAP tables themselves; MOLAP, a literal cube of just dimensions and the intersection data stored separately from, or inside an OLAP table or in the computers RAM memory; and HOLAP, which is a hybrid of ROLAP and MOLAP.

The cube system has helped to fill some of the gaps between relational databases and the natural relationships of data. However, cubes also have weaknesses. The cube system is still a relational system with perfectly matchable data. In fact, the cube system is even more so because the cube treats each dimension equally. The natural relationships of data can still be expressed, but typically through many small cubes with different dimensions to capture the relationship. The second weakness of a cube system is that since cubes utilize intersections, dimensions need to be few and small or the process can create unwieldy cubes with many empty spaces (a cube can contain all possible dimension intersections, even if the data does not exist). Therefore cubes tend to eliminate details that may be important, but inexpressible in that format. Further, OLAP dimensions are not easily organized, nor are they easily matched across databases. Dimensions may contain the same theme (like "time") but because the elements are different, joining dimensions together are difficult because they are not naturally defined in the database. Moreover, OLAP reporting systems cannot effectively respond to ad-hoc drill-down requests because they do not differentiate between high level and low level data. DBAs have to setup various processes and procedures to anticipate possible drill-down requests of end users.

BRIEF DESCRIPTION OF THE DRAWINGS

The present invention is illustrated by way of example, and not by way of limitation, in the figures of the accompanying drawings and in which:

FIGS. 6A and 6B illustrate exemplary user interfaces for enabling an ad-hoc drill-down functionality in a report.

DETAILED DESCRIPTION

Described herein is a method and apparatus for real time statistical analysis of data included in a report. In one embodiment, a datamining tool allows a user to select a value in a report associated with a specific pyramid level and to request statistical analysis of lower level data pertaining to the value from the report. The lower level data may be transaction data (from the transactional database) associated with the lowest level of the reporting pyramid. In response to the user request, the datamining tool identifies a datamining function to be performed on the lower level data pertaining to the value from the report. The datamining tool also identifies statistical variables to be used for the statistical analysis, and determines the statistical criteria needed for running the statistical analysis in the datamining function. The statistical variables may be represented by dimensions included in the original report, and the statistical criteria may be the criteria used for the creation of the original report. Based on the variables and the criteria, the datamining tool submits a query or a database API call to the transactional database.

Upon receiving the result set from the transactional database, the datamining tool performs the datamining function on this lower level data. The result of the datamining function is then used by a report builder to create a report illustrating statistical analysis of the above lower level data.

Embodiments of the present invention use the reporting pyramid model to make relationships of transactional data visible, and to easily identify datasets that should be utilized for statistical analysis. By utilizing dimensions inside the reporting pyramid as statistical variables, a much smaller dataset can be used for datamining, resulting in better statistics. The pyramid model allows for guided datamining that provides a better visual perspective of how the datasets being tested fit in with the rest of the data.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion it is appreciated that throughout the description, discussions utilizing terms such as "sending", "receiving", "comparing", "hashing", "maintaining", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more a specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., carrier waves, infrared signals, digital signals, etc.)), etc.

Figure 1:
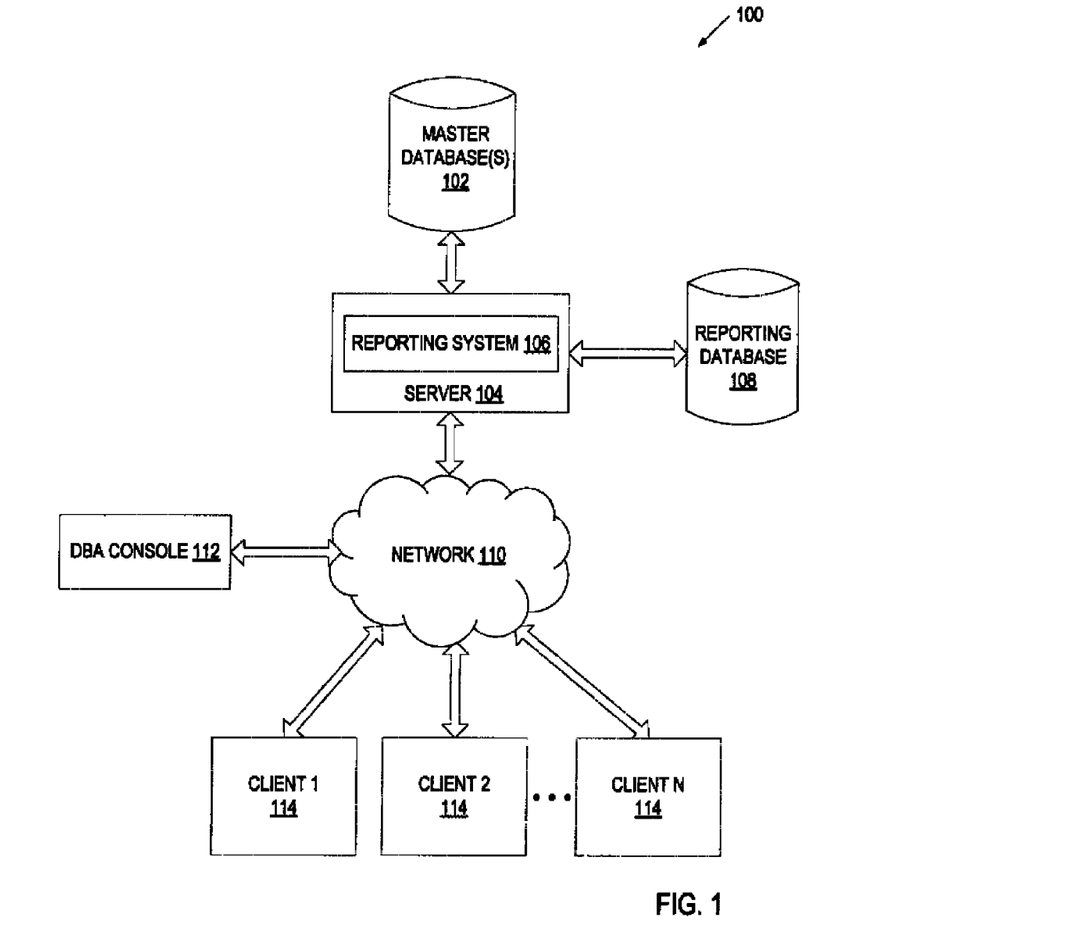
FIG. 1 illustrates a network architecture in which embodiments of the present invention may be implemented.

FIG. 1 illustrates an exemplary network architecture 100 in which embodiments of the present invention may operate. The network architecture 100 may include client devices (clients) 114, a server 104, a DBA console 112, and a network 110. The clients 114 may be, for example, personal computers (PCs), mobile phones, palm-sized computing devices, personal digital assistants (PDAs), and the like. Each client 114 contains hardware components and software components including a browser application to render data provided by the server 104.

The server 104 may be, for example, a server computer, a PC, or any other machine. The server 104 may be coupled to the clients 114 via the network 110, which may be a public network (e.g., Internet) or a private network (e.g., Ethernet, a Local Area Network (LAN), or a corporate intranet). In addition, the server 104 may be coupled to a console 112 via the network 110. The console 112 may be operated by a DBA and may be, for example, a PC, a PDA, a mobile phone, etc. The console 112 may contain hardware components and software components including a browser application to render data provided by the server 104.

The server 104 may be coupled to master database(S) 102 which may reside on one or more storage devices. The server 104 may access the master database 102 directly or via a network (e.g., a private or public network). The master database 102 may represent one or more production databases of an organization or multiple organizations. A production database may be a large relational or transactional database.

The server 104 may host a reporting system 106 that transforms data from the master database 102 to be more suitable for reporting, stores the transformed data in a reporting database 108, and provides reporting and datamining capabilities for end users with respect to the production data. The reporting database 108 may reside on one or more storage devices and may be accessible to the reporting system 106 via a network (private or public network) or directly. The reporting system 106 provides graphical user interfaces (GUIs) to assist a DBA operating the console 112 in populating the reporting database 108. The reporting system 106 uses a pyramid model to simplify storage of production data in the reporting database 108 and to facilitate efficient reporting and datamining capabilities. A reporting pyramid as referred to herein provides a visual representation of production data transformed for reporting, with the top of the pyramid having the least amount of detail, and the bottom of the pyramid including the most details. In addition, the reporting system 106 assists end users operating the client devices 114 in the creation of reports based on production data, and provides real time statistical analysis of ad-hoc data elements included in the report.

Figure 2:
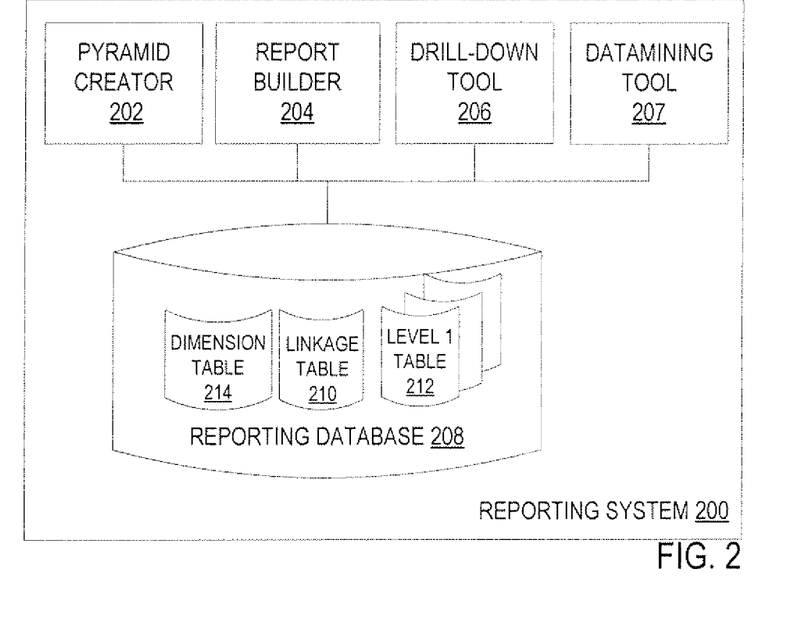
FIG. 2 illustrates a block diagram of one embodiment of a reporting system.

FIG. 2 is a block diagram of one embodiment of a reporting system 200. The reporting system 200 may include a pyramid creator 202, a report builder 204, a drill-down tool 206, a datamining tool 207, and a reporting database 208.

The pyramid creator 202 allows a user such as a DBA to view data fields (e.g., data element names or column names) included in a production database and to create dimensions from the data fields. The pyramid creator 202 may then store the mappings between the production data fields and the dimensions in a dimension table 214 of the reporting database 208. In addition, the pyramid creator 202 may allow a DBA to specify a desired number of levels for a reporting pyramid, and to link dimensions to specific levels of the reporting pyramid. The pyramid creator 202 creates a table 212 for each level of the reporting pyramid in the reporting database 208, and stores relationships between the tables 212 in a linkage table 210 of the reporting database.

The report builder 204 allows end users to request specific reports, and then processes these reporting requests of end users by accessing a table associated with an appropriate reporting level. The report builder 204 presents reports to end users, and allows an end user to submit an ad-hoc drill-down request for any element of the report.

When requesting reports, user are likely to start with a small amount of detail and then drill down to request more details for specific components of the report. This approach is reflected in the reporting pyramid model used by the reporting system 200. Each reporting pyramid level may be associated with specific individuals within the organization. For example, the CEO may be mostly interested in the top level summary data to analyze overall statistics of the organization. A regional manager may be mostly interested in a lower level data that provides summary data for different departments within the region. A salesperson in a specific department may be mostly interested in data describing his or her department, and may not even have access to the top level organization data or region summary data. In one embodiment, a table is created for each reporting level to store dimensions available at a relevant reporting level (plane) and to allow users to easily move between the different planes. Different tables can be setup for different people, different views, different access levels, etc. The tables can be organized in various ways. In one embodiment, the tables can be organized using the MOLAP approach (first approach) and can contain only an index and one master value (the intersection or summary value in the MOLAP cube). In another embodiment, the tables may be organized using an enhanced MOLAP approach (second approach) by containing an index and a master value, and also having an additional value (which can be an index to a different database/schema for additional drilling, description, etc.). In yet another embodiment, the tables can be organized using a further enhanced MOLAP approach (third approach) and can contain an index, a master value, and additional multiple values or details formatted as a flat table. Such a flat table may use row delimiters and be compacted into a row size. For example, below is an exemplary Table 1:

TABLE 1

| Car | Color | Year |
|---|---|---|
| Buick | Red | 2006 |
| Ford | Blue | 1999 |
| Chevy | White | 2002 |

Table 1 can be converted into a single row using row delimiters as follows:

Buickμfordμchevy?redμblueμwhite?2006μ1999μ2002

In still alternative embodiments, a combination of the above table organization approaches can be used for different reporting planes. For example, the first approach may be used for the top planes of the pyramid, the second approach can be used for middle level planes where slightly more details are desirable, and the third approach may used for the base of the pyramid where unsummarized data is contained or as a basis for data mining (e.g., storing statistics or drilling metadata in the flat table).

The drill-down tool 206 processes ad-hoc drill-down requests submitted by end users for any data elements selected in the report. In particular, the drill-down tool 206 receives a drill-down request, moves down to a next reporting level and accesses the table associated with this next reporting level to provide requested data.

The datamining tool 207 provides real time statistical analysis for data included in the report. In one embodiment, the datamining tool 207 allows a user to select a value in a report associated with a specific pyramid level and to request datamining of lower level data pertaining to the value from the report. In response to the user request, the datamining tool 207 provides a user interface (UI) that allows a user to specify a datamining function (e.g., linear regression, quantile regression, covariance, Pearson Product-Moment correlation, correlation coefficient, standard deviation, variance, distributions tests, etc.) to be performed on the lower level data, and to select dimensions inside the pyramid as statistical variables for use in datamining. In response, the datamining tool 207 creates a query based on the selected dimensions and the criteria used in the creation of the original report, and executes the query to obtain the lower level data that pertains to the selected dimensions and matches the criteria. Next, the datamining tool 207 applies the user-specified datamining function to the returned data and provides the result of this datamining to the report builder 204, which creates a report showing the datamining results, and displays this report to the user.

Figure 3:
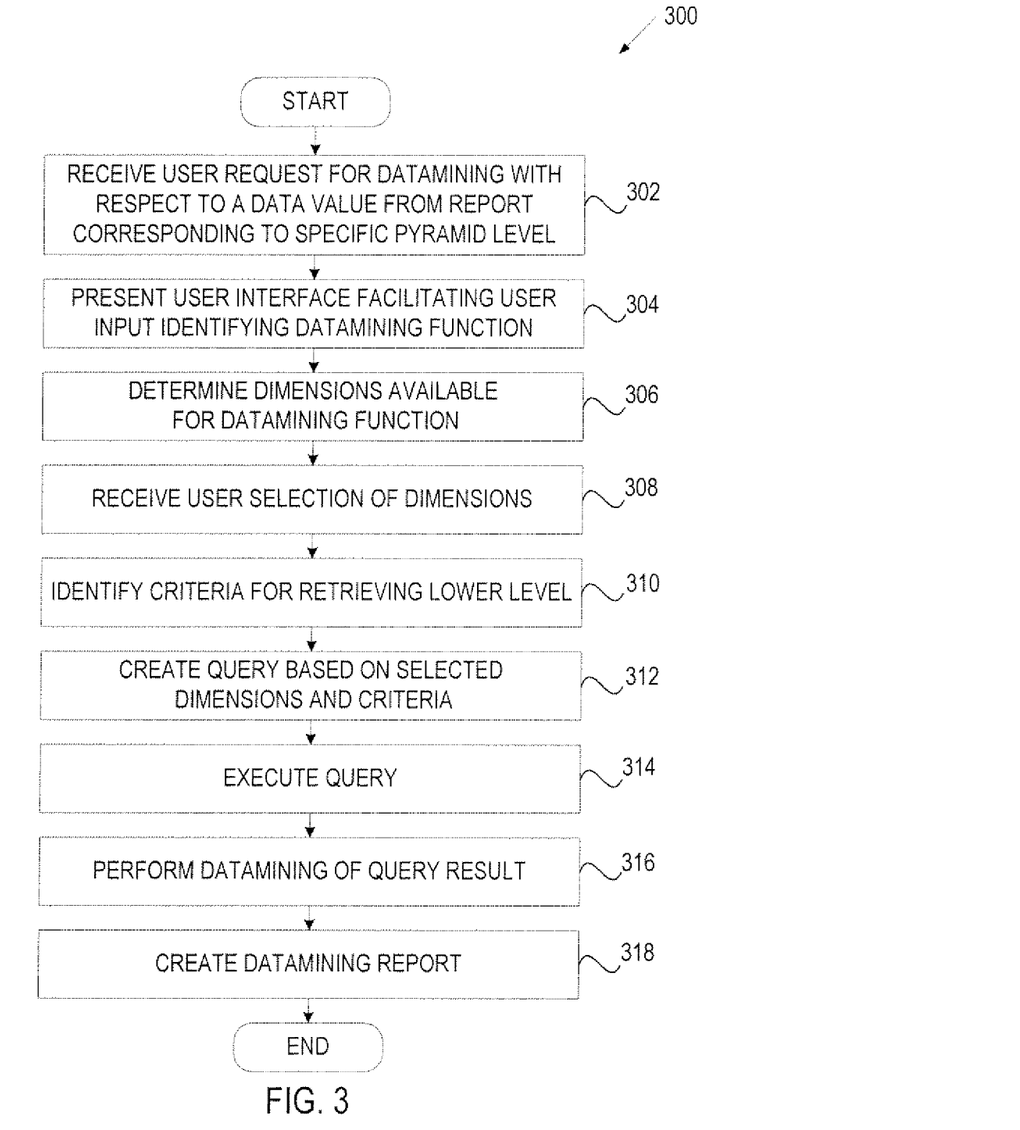
FIG. 3 illustrates a flow diagram of one embodiment of a method for performing ad-hoc statistical analysis.

FIG. 3 illustrates a flow diagram of one embodiment of a method 300 for performing ad-hoc statistical analysis of production data using a reporting pyramid model. The method 300 may be performed by processing logic that may comprise hardware (e.g., circuitry, dedicated logic, programmable logic, microcode, etc.), software (such as instructions run on a processing device), or a combination thereof. In one embodiment, the method 300 is performed by the reporting system 106 of FIG. 1.

Referring to FIG. 3, method 300 begins with processing logic receiving a user selection of a data element (data value) from a report associated with a specific pyramid level, and further receiving a request for statistical analysis of lower level data pertaining to the selected data element (block 302). In response processing logic presents a user interface that facilitates user input identifying a datamining function desired by the user (e.g., linear regression) (block 304).

At block 306, processing logic determines which dimensions can be used as statistical variables for the datamining function, and displays a list these dimensions to the user. The displayed dimensions represent the dimensions that were originally used for the creation of the report, and can independent dimensions that do not depend on any other dimensions (e.g., date, time, etc.) or dependent dimensions that depend on some other dimensions (e.g., a city dimension may depend on a state dimension to remain valid such as Cleveland Utah and Cleveland Ohio).

At block 308, processing logic receives user selection of the dimensions from the list. At block 310, processing logic identifies criteria for retrieving the lower level data from the production database(s). In one embodiment, the criteria includes parameters used for the original report. In addition, the criteria may include a user-specified pyramid level of the lower level data, or use the lowest level of the reporting pyramid as a default (e.g., transactional data from the transactional database and/or detailed data such as data described above in conjunction with Table 1).

At block 312, processing logic creates a query or a database API call based on the selected dimensions and the criteria. At block 314, processing logic submits the query or the API database call to one or more source databases (e.g., transaction database). At block 316, processing logic performs datamining by applying the user-specified function to the returned dataset. At block 318, processing logic creates a datamining report based on the datamining result.

Figure 4:
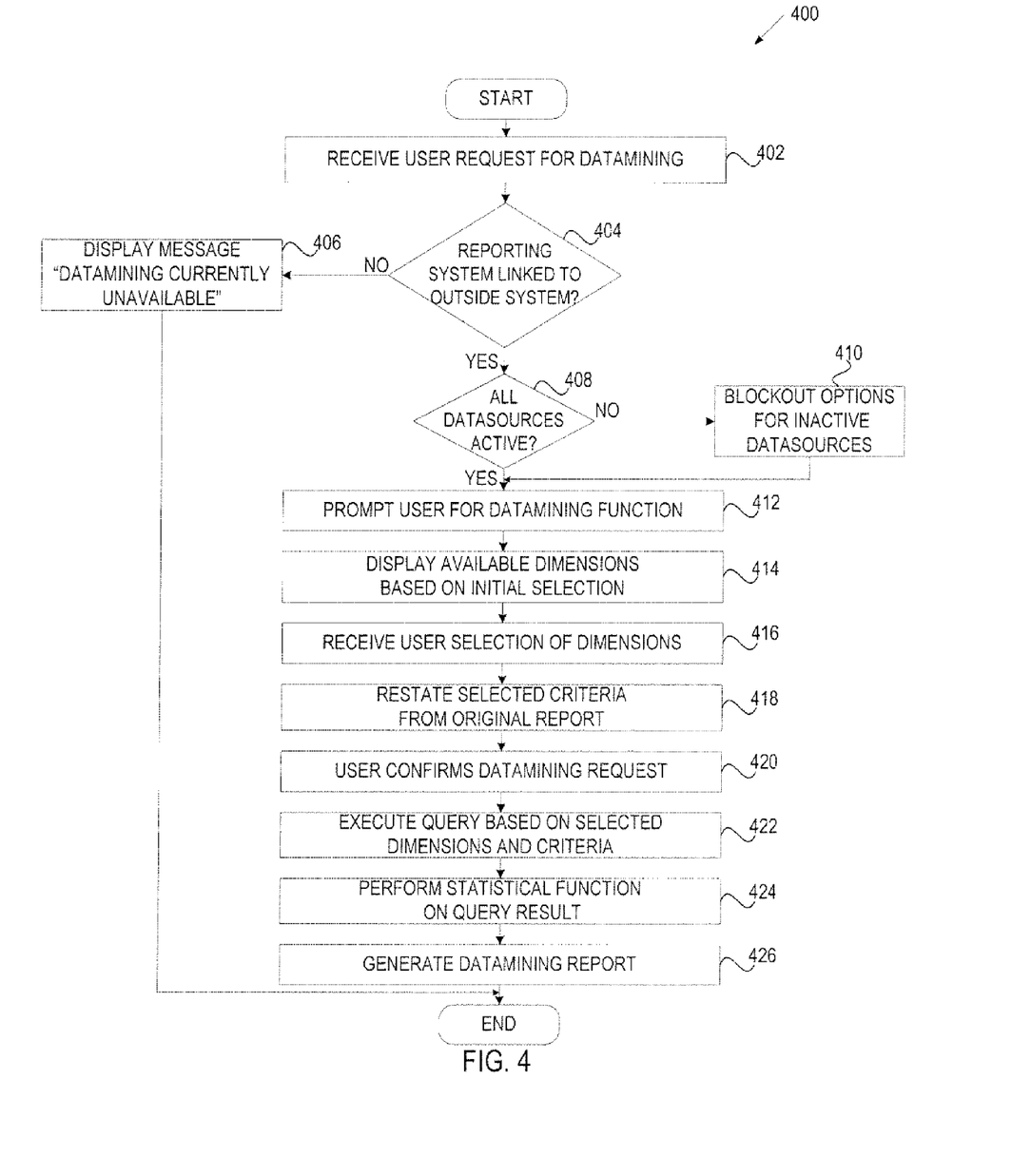
FIG. 4 illustrates a flow diagram of one embodiment of a method for facilitating real time datamining.

FIG. 4 illustrates a flow diagram of one embodiment of a method 400 for facilitating real time datamining. The method 400 may be performed by processing logic that may comprise hardware (e.g., circuitry, dedicated logic, programmable logic, microcode, etc.), software (such as instructions run on a processing device), or a combination thereof. In one embodiment, the method 400 is performed by the reporting system 106 of FIG. 1.

Referring to FIG. 4, method 400 begins with processing logic receiving a user request for statistical analysis pertaining to an ad-hoc data element in a report (block 402). In response, processing logic determines whether the reporting system is linked to an outside database system (block 404). If not, processing logic displays a message "Datamining is currently unavailable," and method 400 ends. If so, processing logic determines whether all data sources are currently active. If all data sources are active, processing logic proceeds to block 408. If some data sources are inactive, processing logic blocks options for the inactive data sources (block 410) and proceeds to block 412.

At block 412, processing logic prompts the user for a desired datamining function. At block 414, processing logic displays variable dimensions available based on the pyramid level used for the report. At block 416, processing logic receives the user's selection of the variable dimensions. At block 418, processing logic restates the criteria from the original report to the user.

Upon receiving a confirmation of the datamining request from the user (block 420), processing logic executes a query created based on the selected dimensions and the criteria (block 422). At block 424, processing logic performs the user-specified statistical function on the returned dataset. At block 426, processing logic creates a datamining report based on the datamining results.

Figure 5A:
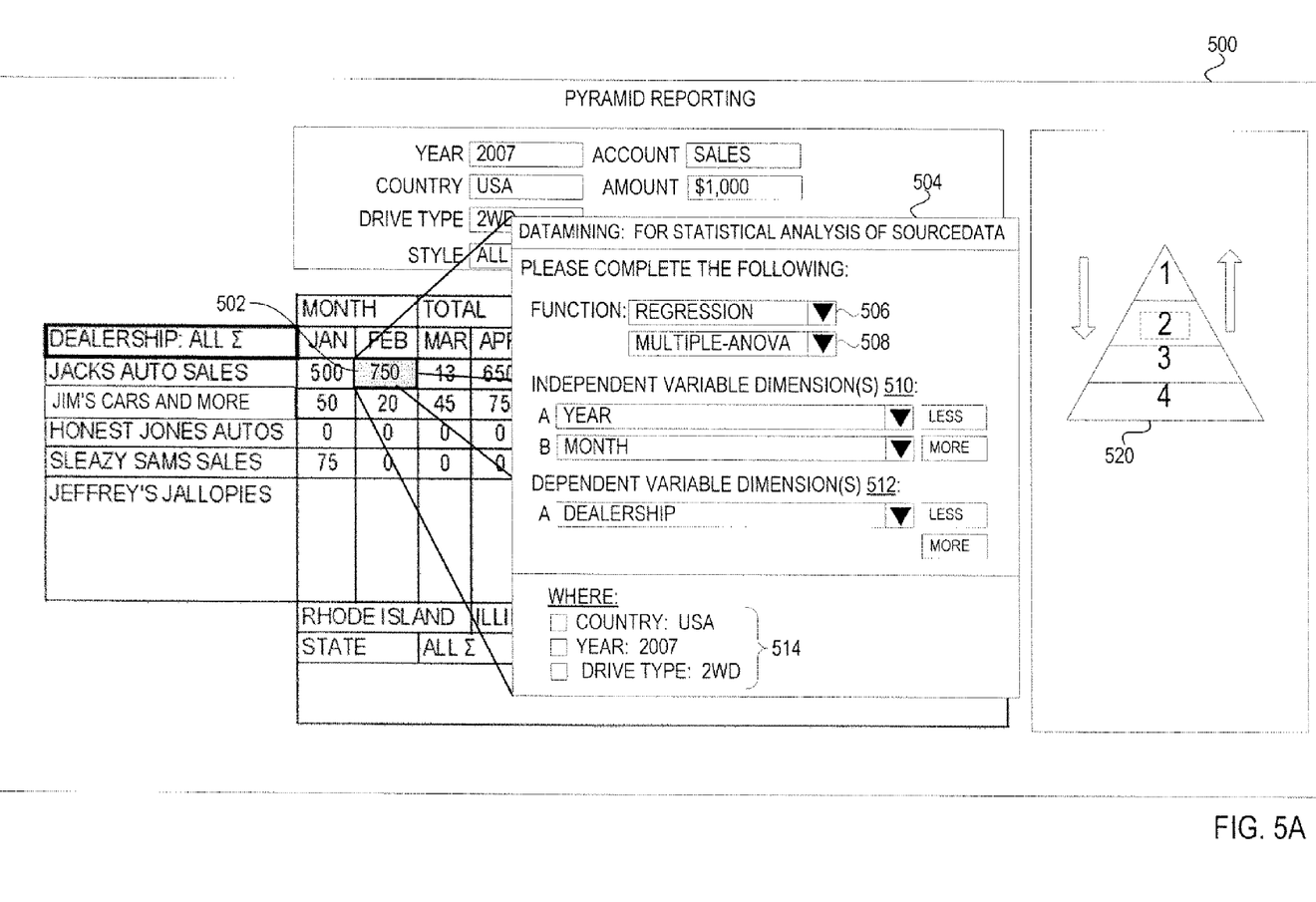
FIGS. 5A and 5B illustrate exemplary user interfaces facilitating real time datamining in accordance with one embodiment of the invention.
Figure 5B:
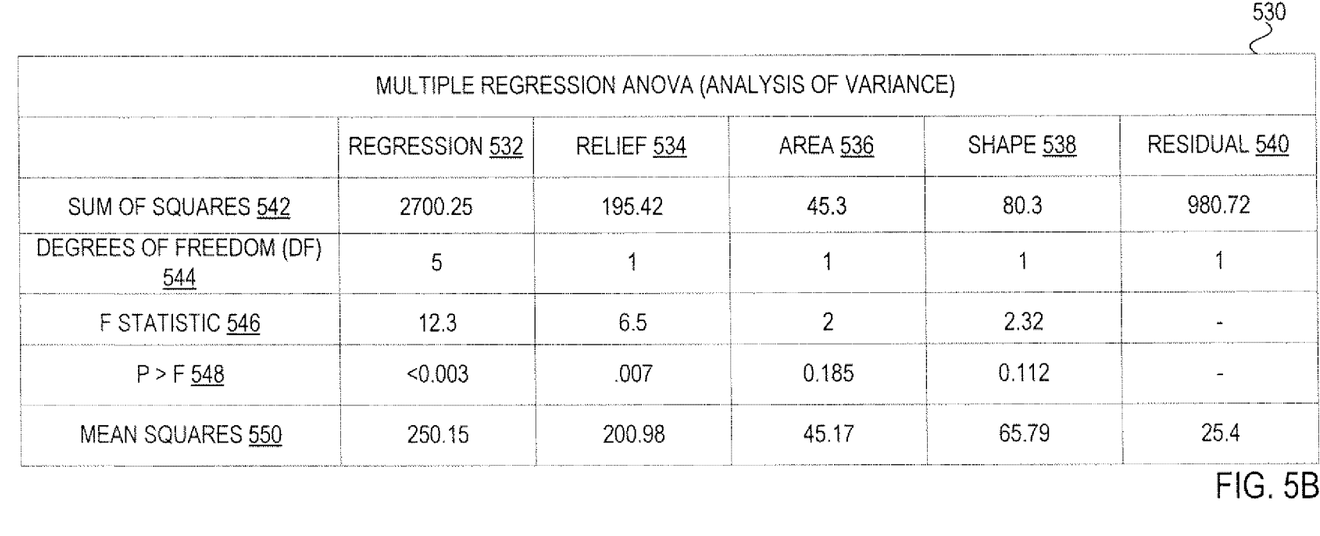

FIGS. 5A and 5B illustrate exemplary user interfaces (UIs) facilitating real time datamining in accordance with one embodiment of the invention. Referring to FIG. 5A, a UI 500 shows a report created for level 2 of pyramid 520. The UI 500 allows a user to select a data element 502 in the report and to submit a datamining request pertaining to the element 502 (e.g., via a designated link or button (not shown)). In response, a popup window 504 appears, prompting the user to select a desired statistical function 506, and then a desired type or sub-category 508 of the statistical function 506. In addition, the user can select desired independent variable dimensions 510 and dependent variable dimensions 512. Further, the window 504 displays the criteria 514 based on the initial parameters used for the creation of the original report.

If the user confirms the datamining request (e.g., via a designated button (not shown)), UI 530 of FIG. 5B appears, displaying the results of the requested statistical analysis. The report 530 includes a variety of statistical calculations, such as sum of squares 542, degrees of freedom (DF) 544, F statistic 546, P>F 548 and mean squares 550, for various statistical parameters, such as regression 532, relief 534, area 536, shape 538 and residual 540.

Figure 6B:
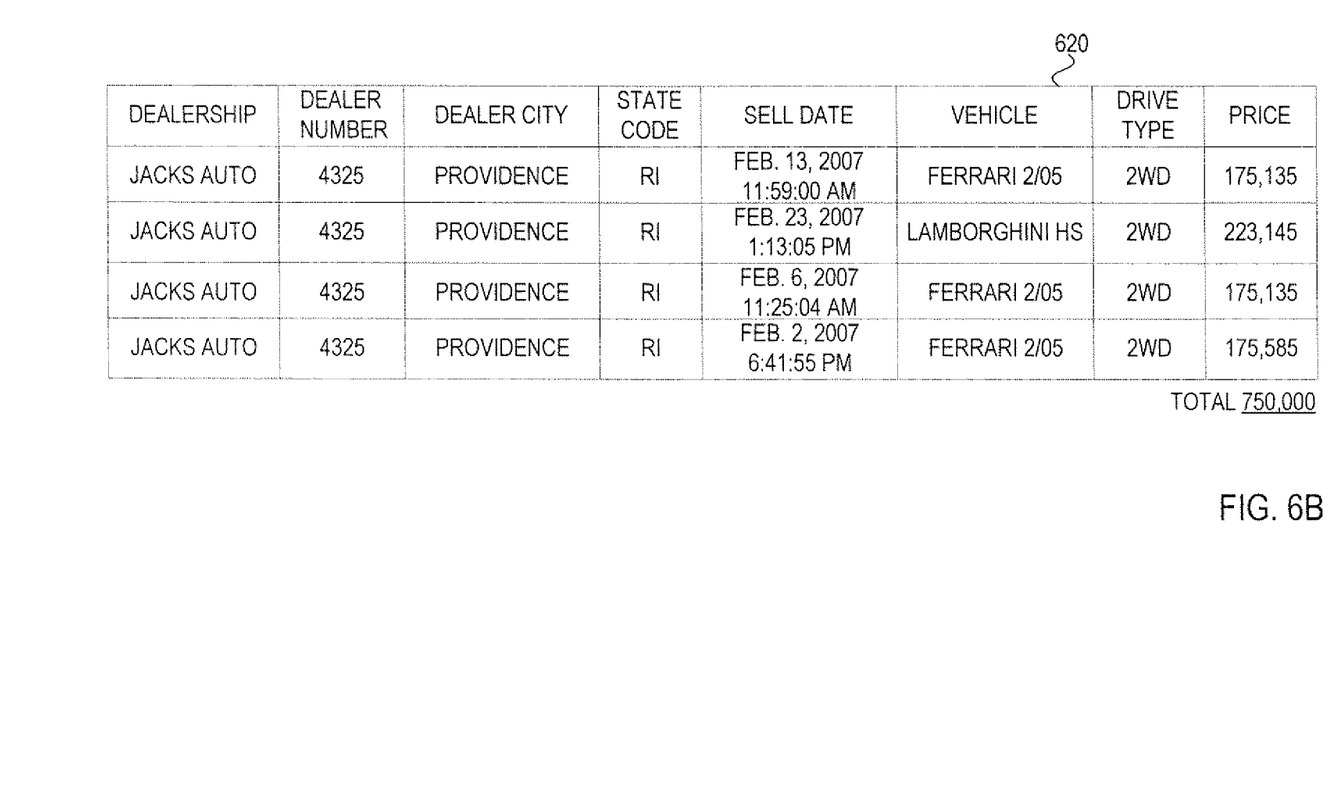

FIGS. 6A and 6B illustrate exemplary user interfaces for enabling an ad-hoc drill-down functionality in a report. Referring to FIG. 6A, a UI 600 shows a report created for level 2 of pyramid 620. The UI 600 allows a user to select a data element 602 in the report and to submit a drill-down request pertaining to the element 602 (e.g., via a designated link or button (not shown)). In response, a popup window 604 appears, prompting the user to specify the pyramid level 606 for the drill down operation. In addition the user can select the format 608 for a resulting report and how this report should be delivered (delivery method such as email 610). In response, a table associated with the specified pyramid level 606 is accessed to identify product data that needs to be retrieved to obtain the requested information.

Referring to FIG. 6B, an exemplary report 620 generated in response to the drill-down request is shown. The report 620 includes detailed information pertaining to the data field 602 selected in the report.

Figure 7:
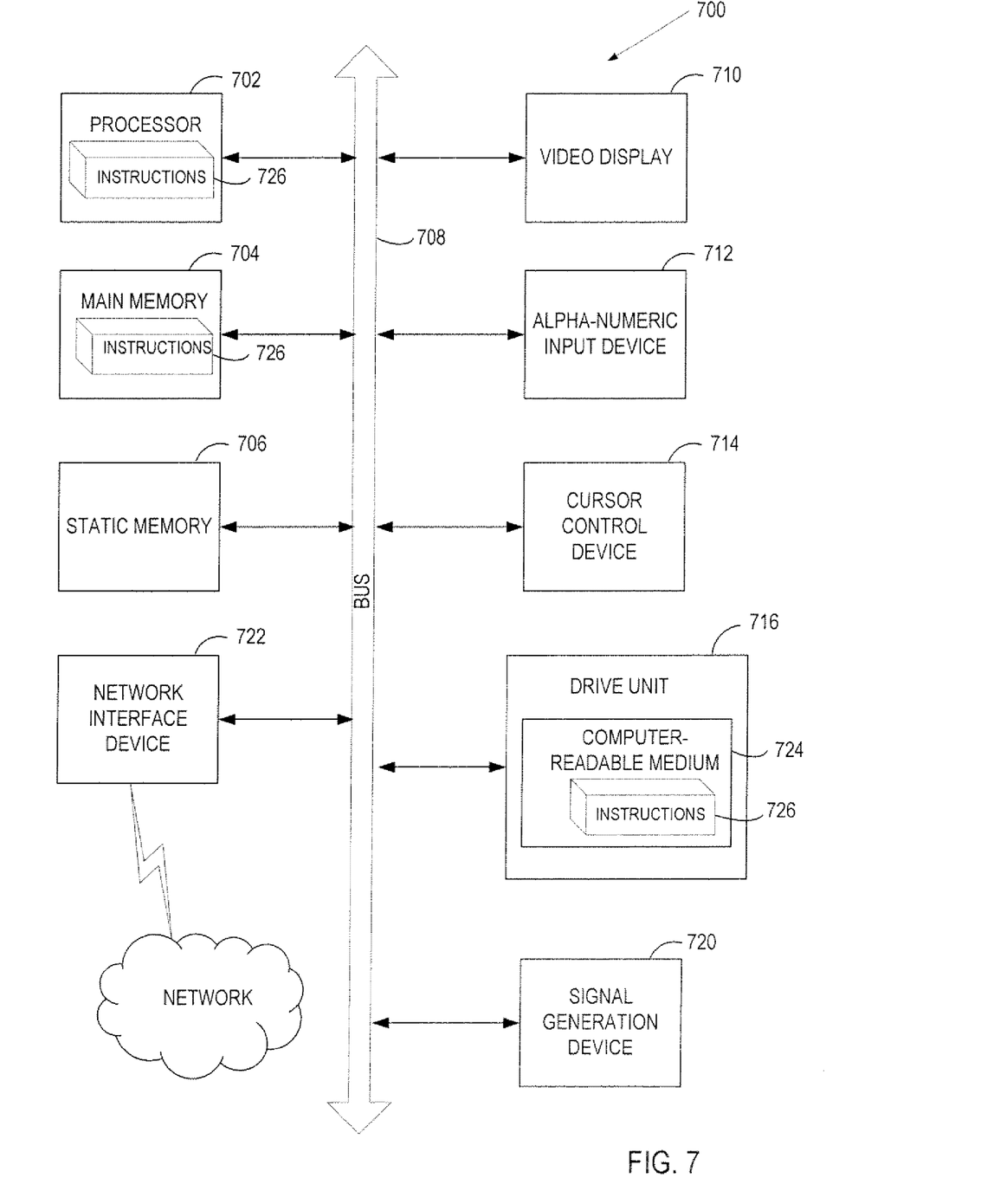
FIG. 7 illustrates a block diagram of an exemplary computer system implementing some embodiments of the present invention.

FIG. 7 illustrates a diagrammatic representation of a machine in the exemplary form of a computer system 700 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a device machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 700 includes a processor 702, a main memory 704 (e.g., read-only memory (ROM), flash memory, dynamic random access memory (DRAM) such as synchronous DRAM (SDRAM) or Rambus DRAM (RDRAM), etc.), a static memory 706 (e.g., flash memory, static random access memory (SRAM), etc.), and a secondary memory 718 (e.g., a data storage device), which communicate with each other via a bus 730.

Processor 702 represents one or more general-purpose processing devices such as a microprocessor, central processing unit, or the like. More particularly, the processor 702 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 702 may also be one or more special-purpose processing devices such as an application specific integrated circuit (ASIC), a field programmable gate array (FPGA), a digital signal processor (DSP), network processor, or the like. Processor 702 is configured to execute the processing logic 726 for performing the operations and steps discussed herein.

The computer system 700 may further include a network interface device 708. The computer system 700 also may include a video display unit 710 (e.g., a liquid crystal display (LCD) or a cathode ray tube (CRT)), an alphanumeric input device 712 (e.g., a keyboard), a cursor control device 714 (e.g., a mouse), and a signal generation device 716 (e.g., a speaker).

The secondary memory 718 may include a machine-readable storage medium (or more specifically a computer-readable storage medium) 731 on which is stored one or more sets of instructions (e.g., software 722) embodying any one or more of the methodologies or functions described herein. The software 722 may also reside, completely or at least partially, within the main memory 704 and/or within the processing device 702 during execution thereof by the computer system 700, the main memory 704 and the processing device 702 also constituting machine-readable storage media. The software 722 may further be transmitted or received over a network 720 via the network interface device 708.

While the machine-readable storage medium 831 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present invention. The term "machine-readable storage medium" shall accordingly be taken to include, but not be limited to, solid-state memories, and optical and magnetic media.

Many other embodiments will be apparent to those of skill in the art upon reading and understanding the above description. The scope of the invention should, therefore, be determined with reference to the appended claims, along with the full scope of equivalents to which such claims are entitled.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A method comprising:
   determining a plurality of dimensions within a reporting pyramid model to be used as statistical variables, the reporting pyramid model comprising a plurality of pyramid levels;
   identifying criteria for retrieving lower level data associated with a value from a first report corresponding to one of the plurality of pyramid levels;
   submitting to a database, by a processing device, a request for a dataset, wherein the request is in view of the plurality of dimensions and the criteria;
   receiving the dataset in response to the request;
   applying to the dataset, by the processing device, a user-selected statistical function; and
   creating, by the processing device, a second report in view of the user-selected statistical function.

2. The method of claim 1, wherein the user-selected statistical function is one of a linear regression, a quantile regression, a covariance, a Pearson Product-Moment correlation, a correlation coefficient, a standard deviation, a variance, or a distribution test.

3. The method of claim 1, wherein determining the plurality of dimensions comprises:
   displaying a first list of independent dimensions available at one of the plurality of pyramid levels of the first report;
   displaying a second list of dependent dimensions available at the one of the plurality of pyramid levels of the first report; and
   receiving a user selection of independent and dependent dimensions from the first and second lists for use as statistical variables.

4. The method of claim 1, wherein the lower level data is transactional data from one or more a transactional database.

5. The method of claim 1, further comprising identifying, in view of a user input, the user-selected statistical function.

6. The method of claim 1 further comprising:
   receiving a datamining request from a user;
   in response to receiving the datamining request, determining whether a reporting system is currently linked to a database management system; and
   when the reporting system is not currently linked to the database management system, notifying the user that the datamining is currently unavailable.

7. The method of claim 6 further comprising:
   when the reporting system is currently linked to the database management system, determining whether any databases of the database management system are inactive; and
   when any databases are inactive, blocking options associated with the inactive databases.

8. The method of claim 1 wherein the datamining request is a databases query or a database application programming interface (API) call.

9. The method of claim 1, wherein each of the plurality of dimensions is associated with a pyramid level.

10. The method of claim 1, wherein the reporting pyramid model comprises a top and a bottom, the top of the pyramid comprising a lesser amount of detail than the bottom of the pyramid.

11. A system comprising:
   a memory to store a first report and a second report; and
   a processing device to:
   determine a plurality of dimensions within a reporting pyramid model to be used as statistical variables, the reporting pyramid model comprising a plurality of pyramid levels,
   identify criteria for retrieving lower level data associated with a value from the first report corresponding to one of the plurality of pyramid levels,
   submit a request for a dataset to a database, wherein the request is in view of the plurality of dimensions and the criteria,
   receive the dataset in response to the request,
   apply to the dataset a user-selected statistical function, and
   create the second report in view of the user-selected statistical function.

12. The system of claim 11, wherein the user-selected statistical function is one of a linear regression, a quantile regression, a covariance, a Pearson Product-Moment correlation, a correlation coefficient, a standard deviation, a variance, or a distribution test.

13. The system of claim 11, wherein when determining the plurality of dimensions, the processing device is to:
   display a first list of independent dimensions available at one of the plurality of pyramid levels of the first report;
   display a second list of dependent dimensions available at the one of the plurality of pyramid levels of the first report; and
   receive a user selection of independent and dependent dimensions from the first and second lists for use as statistical variables.

14. The system of claim 11, wherein the processing device is further to:
   receive a datamining request from a user;
   in response to receiving the datamining request, determine whether a reporting system is currently linked to a database management system; and
   when the reporting system is not currently linked to the database management system, notify the user that datamining is currently unavailable.

15. A non-transitory computer readable storage medium including instructions that, when executed by a processing device, cause the processing device to perform operations comprising:
   determining a plurality of dimensions within a reporting pyramid model to be used as statistical variables, the reporting pyramid model comprising a plurality of pyramid levels;
   identifying criteria for retrieving lower level data associated with a value from a first report corresponding to one of the plurality of pyramid levels;
   submitting to a database, by the processing device, a request for a dataset, wherein the request is in view of the plurality of dimensions and the criteria;
   receiving the dataset in response to the request;
   applying to the dataset by the processing device, a user-selected statistical function; and
   creating, by the processing device, a second report based on the statistical function.

16. The non-transitory computer readable storage medium of claim 15, wherein the statistical function is one of a linear regression, a quantile regression, a covariance, a Pearson Product-Moment correlation, a correlation coefficient, a standard deviation, a variance, or a distribution test.

17. The non-transitory computer readable storage medium of claim 15, wherein determining the plurality of dimensions comprises:
   displaying a first list of independent dimensions available at one of the plurality of pyramid levels of the first report;
   displaying a second list of dependent dimensions available at the one of the plurality of pyramid levels of the first report; and
   receiving a user selection of independent and dependent dimensions from the first and second lists for use as statistical variables.

18. The non-transitory computer readable storage medium of claim 15, wherein the lower level data is transactional data from a transactional database.

19. The non-transitory computer readable storage medium of claim 15, wherein the operations further comprise:
   receiving a datamining request from a user;
   in response to receiving the datamining request, determining whether a reporting system is currently linked to a database management system; and
   when the reporting system is not currently linked to the database management system, notifying the user that datamining is currently unavailable.

20. The non-transitory computer readable storage medium of claim 19, wherein the operations further comprise:
   when the reporting system is currently linked to the database management system, determining whether any databases of the database management system are inactive; and
   when any of the databases are inactive, blocking options associated with the inactive databases.

* * * * *